US009734362B2

(12) United States Patent
Seo et al.

(10) Patent No.: US 9,734,362 B2
(45) Date of Patent: Aug. 15, 2017

(54) ELECTRONIC DEVICE, USER INPUT APPARATUS CONTROLLING THE SAME, AND CONTROL METHOD THEREOF

(71) Applicant: SAMSUNG ELECTRONICS CO., LTD., Suwon-si (KR)

(72) Inventors: Dae-won Seo, Jeonju-si (KR); Doh-hyeong Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 13/729,924

(22) Filed: Dec. 28, 2012

(65) Prior Publication Data
US 2013/0169418 A1  Jul. 4, 2013

(30) Foreign Application Priority Data
Dec. 30, 2011  (KR) .................. 10-2011-0147208

(51) Int. Cl.
*H04Q 5/22* (2006.01)
*G06K 7/00* (2006.01)
(Continued)

(52) U.S. Cl.
CPC ........ *G06K 7/0008* (2013.01); *H04M 1/7253* (2013.01); *H04N 21/4222* (2013.01);
(Continued)

(58) Field of Classification Search
CPC .. H04N 21/235; H04N 21/435; H04N 21/454; H04N 21/4126; H04N 21/4424;
(Continued)

(56) References Cited

U.S. PATENT DOCUMENTS 6,006,034 A  12/1999  Heath et al.
6,133,847 A  10/2000  Yang
(Continued)

FOREIGN PATENT DOCUMENTS

CN          101305611 A     11/2008
KR    10-2006-0083272 A     7/2006
(Continued)

OTHER PUBLICATIONS

Communication dated Apr. 29, 2013, issued by the European Patent Office in counterpart European Patent Application 12198208.6.
(Continued)

*Primary Examiner* — John A Tweel, Jr.
*Assistant Examiner* — Adnan Aziz
(74) *Attorney, Agent, or Firm* — Sughrue Mion, PLLC

(57) ABSTRACT

An electronic device executing an application through communication with a user input apparatus, the electronic device is provided. The electronic device includes: a communication unit that is configured to communicate with the user input apparatus; an information generation unit that generates information about an exclusive controller that controls the application and is executed in the user input apparatus; and a controller that controls the information generation unit to generate the information about the exclusive controller when the electronic device is paired with the user input apparatus, and controls the communication unit to transmit the generated information about the exclusive controller to the user input apparatus.

25 Claims, 7 Drawing Sheets

(51) Int. Cl.
- *H04N 21/81* (2011.01)
- *H04N 21/422* (2011.01)
- *H04N 21/426* (2011.01)
- *H04N 21/436* (2011.01)
- *H04M 1/725* (2006.01)

(52) U.S. Cl.
CPC . *H04N 21/42207* (2013.01); *H04N 21/42684* (2013.01); *H04N 21/43615* (2013.01); *H04N 21/8173* (2013.01); *H04N 21/8186* (2013.01); *H04M 1/72525* (2013.01); *H04M 1/72544* (2013.01)

(58) Field of Classification Search
CPC ........... H04N 21/4516; H04N 21/4758; H04N 21/8166; H04N 21/8173; H04N 21/8186; H04N 21/8545; H04N 21/47815; H04N 21/43637; H04N 21/44227; H04N 21/42684; H04N 21/43615; H04N 21/4222; H04N 21/42207; H04N 21/6377; H04N 21/2381; H04N 21/233; H04N 21/2343; H04N 21/6405; H04N 21/4781; G06K 7/0008
USPC ...................................................... 340/10.1
See application file for complete search history.

(56) References Cited

U.S. PATENT DOCUMENTS

| | | | | |
|---|---|---|---|---|
| 6,725,260 | B1* | 4/2004 | Philyaw | G06F 9/4411 707/E17.112 |
| 7,992,187 | B2* | 8/2011 | Chiao | H04N 7/163 348/734 |
| 8,015,446 | B2* | 9/2011 | Scott | G06F 3/0481 714/25 |
| 8,417,797 | B2* | 4/2013 | Thoen | H04N 21/234309 345/428 |
| 8,433,306 | B2* | 4/2013 | Rodriguez | G06Q 30/02 455/3.06 |
| 2003/0141987 | A1* | 7/2003 | Hayes | 340/825.72 |
| 2003/0156053 | A1* | 8/2003 | Wall et al. | 341/176 |
| 2005/0076127 | A1* | 4/2005 | Wilson et al. | 709/227 |
| 2005/0235294 | A1* | 10/2005 | Kimura | H04N 21/4143 719/328 |
| 2007/0290882 | A1* | 12/2007 | Consorte et al. | 340/825.72 |
| 2008/0115189 | A1* | 5/2008 | Lejeune | 725/141 |
| 2008/0134049 | A1 | 6/2008 | Gupta et al. | |
| 2008/0168391 | A1 | 7/2008 | Robbin et al. | |
| 2008/0209500 | A1* | 8/2008 | Hironaka et al. | 725/141 |
| 2008/0288993 | A1* | 11/2008 | Aghasaryan et al. | 725/106 |
| 2009/0052863 | A1* | 2/2009 | Parmar | G11B 27/034 386/323 |
| 2010/0134317 | A1* | 6/2010 | Breuil et al. | 340/825.69 |
| 2010/0210293 | A1 | 8/2010 | Lim et al. | |
| 2011/0066960 | A1* | 3/2011 | Suzuki | G06F 8/65 715/764 |
| 2011/0105226 | A1* | 5/2011 | Perlman | A63F 13/12 463/30 |
| 2011/0115698 | A1 | 5/2011 | Chung et al. | |
| 2013/0086577 | A1* | 4/2013 | Nakashima | H04N 21/25808 717/178 |

FOREIGN PATENT DOCUMENTS

| | | |
|---|---|---|
| KR | 10-2009-0085119 A | 8/2009 |
| KR | 10-2010-0065478 A | 6/2010 |
| KR | 10-2010-0092848 A | 8/2010 |
| KR | 10-2011-0041168 A | 4/2011 |
| KR | 10-2011-0053111 A | 5/2011 |
| KR | 10-2011-0082881 A | 7/2011 |
| WO | 04/002149 A1 | 12/2003 |

OTHER PUBLICATIONS

Communication dated Aug. 12, 2015, issued by the Korean Intellectual Property Office in counterpart Korean Application No. 10-2011-0147208.
Communication dated Apr. 23, 2015 issued by the European Patent Office in counterpart Application No. 12 198 208.6.
J. Nichols, et al.; "Controlling Home and Office Appliance with Smart Phones"; Journal of IEEE Pervasive Computing; Jul. 2006; pp. 60-67.
Communication dated Nov. 9, 2015 issued by the Korean Intellectual Property Office in counterpart Korean Application No. 10-2011-0147208.
Communication from the Korean Intellectual Property Office dated Mar. 24, 2016 in counterpart Korean application No. 10-2011-0147208.
Communication dated Nov. 15, 2016 issued by the State Intellectual Property Office of P.R. China in counterpart Chinese Application No. 201210579269.0.

* cited by examiner

ELECTRONIC DEVICE, USER INPUT APPARATUS CONTROLLING THE SAME, AND CONTROL METHOD THEREOF

CROSS-REFERENCE TO RELATED APPLICATION

This application claims priority from Korean Patent Application No. 10-2011-0147208, filed on Dec. 30, 2011 in the Korean Intellectual Property Office, the disclosure of which is incorporated herein by reference.

BACKGROUND

1. Field

Apparatuses and methods consistent with exemplary embodiments relate to an electronic device, a user input apparatus controlling the same, and a control method thereof.

2. Description of the Related Art

Recent developments in digital equipment enable communication between various electronic devices, thereby enabling a variety of contents to be transmitted and received.

Also, such technological advancements result in digital convergence and are applied to diverse areas regardless of communication modes and methods between electronic devices and types of contents. Furthermore, with vigorous communication between consumer electronics, there is an increasing demand of users for various display environments.

Recently, as the game industry is expanded and various contents are developed, a controller for controlling particular software is developed as an independent program. Accordingly, it is important to provide an interface suitable and convenient for a user.

SUMMARY

One or more exemplary embodiments provide an electronic device which is configured to execute an exclusive controller controlling an application without additional selection by a user, a user input apparatus controlling the same, and a control method thereof.

Further, one or more exemplary embodiments provide an electronic device which is configured to update and install an exclusive controller controlling an application without additional selection by a user, a user input apparatus controlling the same, and a control method thereof.

In addition, one or more exemplary embodiments provide an electronic device which is configured to install and execute an application controlled by an exclusive controller controlling without additional selection by a user, a user input apparatus controlling the same, and a control method thereof.

According to an aspect of an exemplary embodiment, there is provided an electronic device including: a communication unit communicating that is configured to communicate with a user input apparatus; an information generation unit that generates information about an exclusive controller that is executed in the user input apparatus and controls an application executed in the electronic device; and a controller that controls the information generation unit to generate the information about the exclusive controller when the electronic device is paired with the user input apparatus, and controls the communication unit to transmit the generated information about the exclusive controller to the user input apparatus.

The information about the exclusive controller may include information about whether the exclusive controller exists, an application identifier (ID), information about a version of the application, and information about a source from which to download the exclusive controller.

The controller may further transmit information about pairing with the user input apparatus to the user input apparatus.

According to an aspect of another exemplary embodiment, there is provided a user input apparatus including: a communication unit that is configured to communicate with an electronic device that executes an application; and a controller that receives through the communication unit information about an exclusive controller that controls the application from the electronic device, and automatically executes the exclusive controller based on the information about the exclusive controller.

The user input apparatus may further include a basic controller that controls the application, wherein the controller conducts pairing with the electronic device through the basic controller, determines whether the exclusive controller exists in the user input apparatus when the information about the exclusive controller is received, and switches the basic controller to the exclusive controller to control the application if it is determined that the exclusive controller exists.

The information about the exclusive controller may include information about whether the exclusive controller exists, an application ID, information about a version of the application, and information about a source from which to download the exclusive controller, and the controller determines whether the exclusive controller exists in the user input apparatus, and downloads the exclusive controller based on the information about the source if it is determined the exclusive controller does not exist.

The information about the exclusive controller may include information about whether the exclusive controller exists, an application ID, information about a version of the application, and information about a source from which to download the exclusive controller, and the controller updates the exclusive controller based on the application ID, the information about the version of the application, and the information about the source.

The communication unit may receive information about pairing with the user input apparatus, and the controller conducts pairing with the electronic device using the information about the pairing when executing the exclusive controller.

According to an aspect of another exemplary embodiment, there is provided a control method of a user input apparatus, the control method including: pairing the user input apparatus with an electronic device through a basic controller of the user input apparatus; receiving information about an exclusive controller controlling an application executable by the electronic device from the electronic device; and automatically executing the exclusive controller at the user input apparatus based on the information about the exclusive controller.

The control method may further include: determining whether the exclusive controller exists in the user input apparatus; and switching the basic controller to the exclusive controller to control the application if it is determined that the exclusive controller exists in the user input apparatus.

The information about the exclusive controller may include information about whether the exclusive controller exists, an application ID, information about a version of the application, and information about a source from which to download the exclusive controller, and the control method further includes determining whether the exclusive controller exists in the user input apparatus, and downloading the exclusive controller based on the information about the source if it is determined the exclusive controller does not exist.

The information about the exclusive controller may include information about whether the exclusive controller exists, an application ID, information about a version of the application, and information about a source from which to download the exclusive controller, and the control method further includes updating the exclusive controller based on the application ID, the information about the version of the application, and the information about the source.

According to an aspect of another exemplary embodiment, there is provided an electronic device including: a communication unit that is configured to communicate with a user input apparatus; and an execution unit that automatically downloads the application based on information about an application received through the communication unit and executes the downloaded application.

The information about the application may include an application ID, information about a version of the application, and information about a source from which to download the application, and the execution unit downloads the application based on the information about the source.

The communication unit may receive information about pairing with the user input apparatus, and the execution unit performs pairing with the user input apparatus using the information about the pairing when executing the application.

According to an aspect of another exemplary embodiment, there is provided a user input apparatus including: a communication unit that is configured to communicate with an electronic device; an exclusive controller that controls an application executable in the electronic device; an information generation unit that generates information about the application; and a controller that controls the exclusive controller so that the user input apparatus is paired with the electronic device, controls the information generation unit to generate the information about the application when the user input apparatus is paired with the electronic device, and controls the communication unit to transmit the information about the application to the electronic device.

The information about the application may include an application ID, information about a version of the application, and information about a source from which to download the application.

The controller may transmit information about pairing with the electronic device to the electronic device.

According to an aspect of an exemplary embodiment, there is provided a control method of an electronic device, the control method including: receiving at the electronic device information about an application from a user input apparatus; automatically downloading the application based on the information about the application; and executing the downloaded application.

The information about the application may include an application ID, information about a version of the application, and information about a source from which to download the application, and the downloading the application downloads the application based on the information about the source.

The control method may further include: receiving information about pairing with the user input apparatus; and performing pairing with the user input apparatus using the information about the pairing when executing the application.

According to an aspect of another exemplary embodiment, there is provided a control method of a user input apparatus, the control method including: pairing the user input apparatus with an electronic apparatus; generating at the user input apparatus information about an application executable in the electronic device; and transmitting the information about the application from the user input apparatus to the electronic device.

The control method may further include transmitting information about pairing with the electronic device from the user input apparatus to the electronic device.

According to an aspect of another exemplary embodiment, there is provided a control method of an electronic device, the control method including: generating information about an exclusive controller that is executed in a user input apparatus and controls an application executed in the electronic; and transmitting the generated information about the exclusive controller from the electronic device to the user input apparatus.

The control method may further include transmitting information about pairing with the user input apparatus from the electronic device to the user input apparatus.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
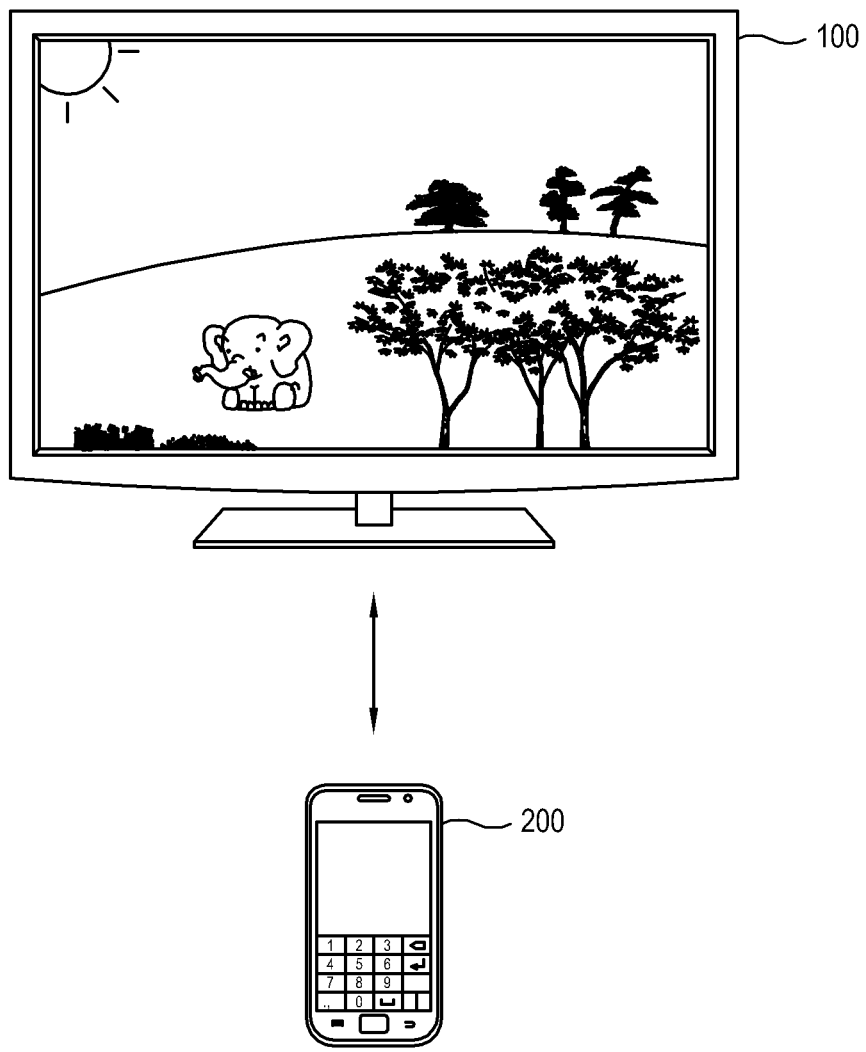
FIG. 1 shows an illustrative example of an electronic device and a user input apparatus controlling the same according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

Figure 2:
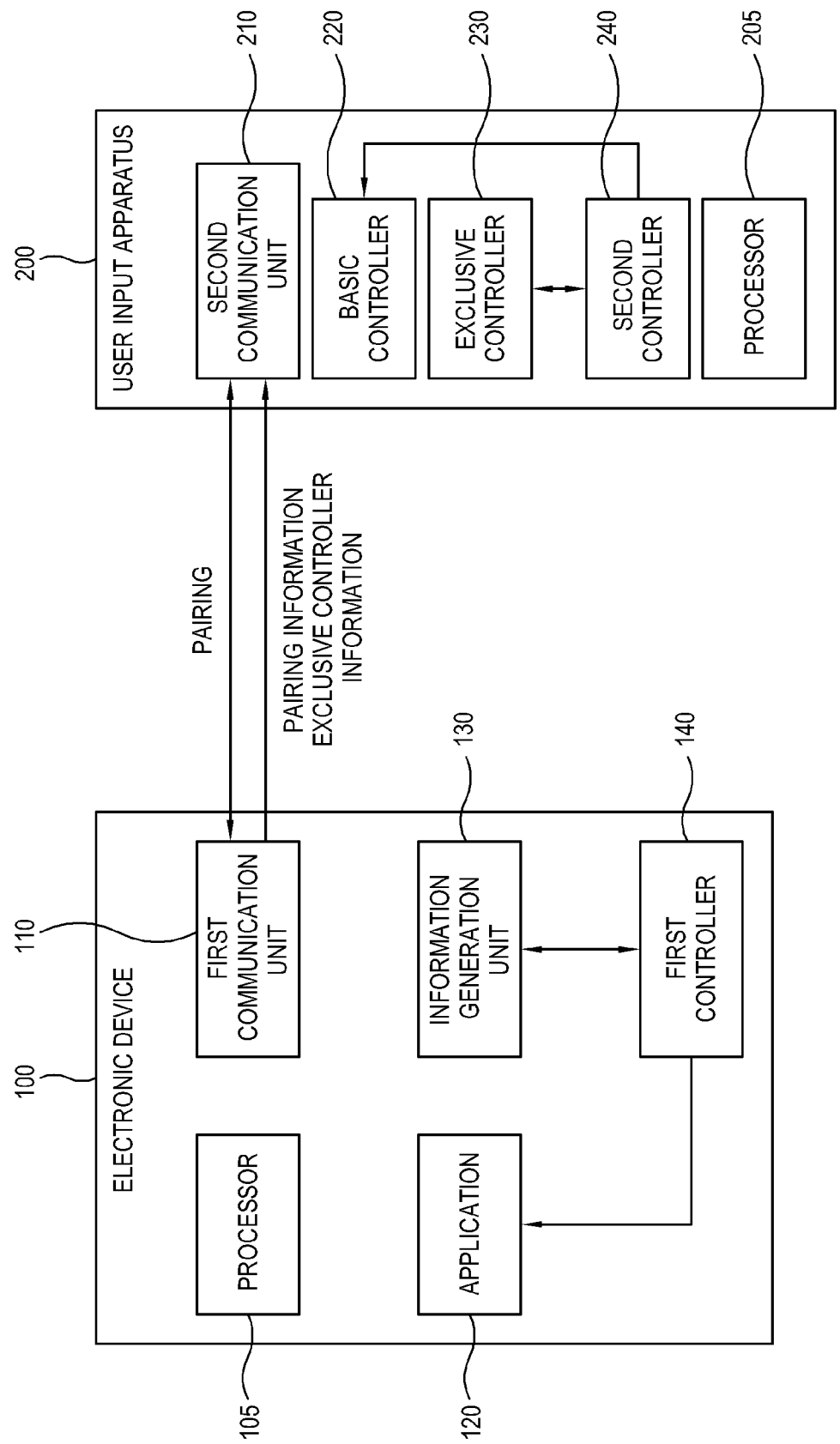
FIG. 2 is a block diagram of the electronic device and the user input apparatus of FIG. 1 according to an exemplary embodiment.

FIG. 1 shows an illustrative example of an electronic device and a user input apparatus controlling the same according to an exemplary embodiment, and FIG. 2 is a block diagram of the electronic device and the user input apparatus of FIG. 1 according to an exemplary embodiment.

As shown in FIG. 1, the electronic device 100 according to the present embodiment is configured as a display apparatus, such as a television (TV), which is capable of playing, executing, and displaying an application, e.g., a game, a video, a still image and/or an electronic book. Further, the electronic device 100 may also be configured as a monitor, a large format display (LFD), and a table top display (TTD) installed in a public place. The electronic device 100 includes a first communication unit 110, an application 120, an information generation unit 130, a first controller 140, and a hardware processor 105 configured to control and/or execute the first communication unit 110, the application 120, the information generation unit 130 and the first controller 140.

The user input apparatus 200 is configured as a mobile phone including a user interface which is configured to control an image displayed on the electronic device 100, that is, an application being executed. The user input apparatus 200 may include a keypad having direction buttons, number buttons, an enter button and a cancel button, or a user interface, such as a touch panel and a touch screen. The user input apparatus 200 may be configured as a remote control device, an additional display apparatus to realize a dual television set and various types of mobile devices, e.g., a personal digital assistant (PDA). The user input apparatus 200 includes a second communication unit 210, a basic controller 220, an exclusive controller 230, a second controller 240, and a hardware processor 205 to control and/or execute the second communication unit 210, the basic controller 220, the exclusive controller 230, and the second controller 240.

The first communication unit 110 performs pairing with the user input apparatus 200 according to control by the first controller 140 and communicates with the second communication unit 120. The first communication unit 110 and the second communication unit 210 may include a communication module corresponding to various communication modes and/or protocols, such as Bluetooth, Wi-Fi, zigbee, infrared (IR) communication, radio frequency (RF) communication, and/or other cable communications. Middleware supporting home networking which allows sharing of digital contents, e.g., music, pictures and videos, stored in an electronic device such as a personal computer, house appliances and a portable terminal includes Universal Plug and Play (UPnP), Home Audio Video Interoperability (HaVi), Jini, VESA, digital living network alliance (DLNA), etc. The electronic device 100 and the user input apparatus 200 according to the present exemplary embodiment may communicate with each other according to DLAN guidelines built upon existing public standards, for example, HTTP, UPnP and Wi-Fi. The DLAN guidelines focus on sharing of all contents provided from devices including a TV, a VCR, a digital camera and an audio system and supports obtaining, transmitting, and managing a large number of digital media contents (e.g., pictures, music and videos) from personal devices such as a mobile device and a personal computer. The first communication unit 110 and the second communication unit 210 may transmit and receive images, user interface information, and various control signals through DLNA-based networking.

The application 120, which refers to software installed and executed in the electronic device 100, may be installed as a default in the electronic device 100 or be downloaded from an external server to the electronic device 100. As described above, the application 120 is configured as software for playing a game, a video, a still image, and/or an electronic book, and a user may perform various types of control while executing the application 120. For example, when the application 120 is game software, the user inputs various input signals using buttons to play a game. The application 120 is controlled according to input by the user, and various images changed accordingly are provided to the user.

The information generation unit 130 generates information about the exclusive controller 230 executed in the user input apparatus 200 to control the application 120. In the present exemplary embodiment, general control software for controlling the application 120 is defined as a basic controller, and software specifically designed for controlling a particular application 120 is defined as an exclusive controller. The basic controller performs basic control of moving an object using a direction key, adjusting sound volume, or executing and stopping an application. The basic controller is installed in the electronic device 100 as well, and the user may control an application using the basic controller installed in the electronic device 100. The exclusive controller may be provided in the user input apparatus 200 which controls the application 120, rather than in the electronic device 100.

When an application is executed, the information generation unit 130 generates exclusive controller information enabling identification of an exclusive controller corresponding to the application 120 through information included by the executed application 120. The exclusive controller information includes information about whether an exclusive controller for controlling the application exists, an application identifier (ID), information about a version of the application, and information about a source to download the exclusive controller from. Through information about whether there exists an exclusive controller corresponding to the application 120 and information enabling identification of the application 120, the exclusive controller 230 corresponding to the application 120 is determined. The exclusive controller information is transmitted to the user input apparatus 200 by the first communication unit 110.

When the electronic device 100 is paired with the user input apparatus 200, the first controller 140 controls the information generation unit 130 to generate exclusive controller information and controls the first communication unit 110 to transmit the generated exclusive controller information to the user input apparatus 200. Further, when the application 120 is controlled by the exclusive controller 230 of the user input apparatus 200, the first controller 140 further transmits information about pairing with the user input apparatus 200 to the user input apparatus 200. The pairing information may include information about matching of the electronic device 100 with the user input apparatus 200 and a media access control (MAC) address and denotes unique information for communication between devices. When an application or software controls a particular device, pairing is generally carried out whenever a new application or software is executed.

The second communication unit 210 performs pairing with the electronic device 100 and communicates with the electronic device 100 according to control by the second controller 240.

The basic controller 220 refers to general software that is configured to control and execute the application 120 installed in the electronic device 100. In the present exemplary embodiment, the user executes the basic controller 220 to start running the application 120.

The exclusive controller 230 refers to a control program which not only has a function of the basic controller 220 but also controls a particular application. That is, the application 120 and the exclusive controller 230 are configured to identify each other. As described above, the exclusive controller 230 may be installed in the user input apparatus 200 or may be downloaded and/or updated through an external server connected to the user input apparatus 200 through a network. If both of the exclusive controller 230 and the basic controller 220 are installed in the user input apparatus 200, the application 120 may be controlled by either of the exclusive controller 230 and the basic controller 220. In the present exemplary embodiment, the exclusive controller 230 is automatically executed.

The second controller 240 receives exclusive controller information about the exclusive controller 230 controlling the application 120 through the second communication unit 210 and automatically executes the exclusive controller 230 based on the exclusive controller information. When the exclusive controller information is received while the basic controller 220 is running, the second controller 240 automatically switches a controller for controlling the application 120 from the basic controller 220 to the exclusive controller 230. When the controller is switched to the exclusive controller 230, the electronic device 100 is controlled by the new controller, not by the previous basic controller 220, and thus it is needed to newly pair the exclusive controller 230 with the electronic device 100. When running the exclusive controller 230, the second controller 240 performs pairing of the electronic device 100 with the exclusive controller 230 using the pairing information.

According to a related art method, a process of identifying whether there exists an exclusive controller needed for an electronic device, a process of obtaining information about the exclusive controller if the exclusive controller exists, and a process of running the exclusive controller and newly pairing the electronic device and a user input apparatus for the execution are entirely carried out by user's input. On the other hand, in the present exemplary embodiment, the electronic device 100 and the user input apparatus 200 automatically perform the entire foregoing processes through network communication. Once a user selects execution of the application 120, the exclusive controller 230 is selected and executed, thereby performing optimal and convenient control for the application 120.

In another exemplary embodiment, the user may change the foregoing processes automatically performed to manual processes or be provided with a graphic interface to identify the exclusive controller information or pairing information while transmitting the information. The second controller 240 may generate and display a graphic interface to ask the user about a selection whenever the processes are changed.

Alternatively, when the user does not desire to change the basic controller 220 to the exclusive controller 230, the second controller 240 may provide the user with a graphic interface to select the exclusive controller 230.

Figure 3:
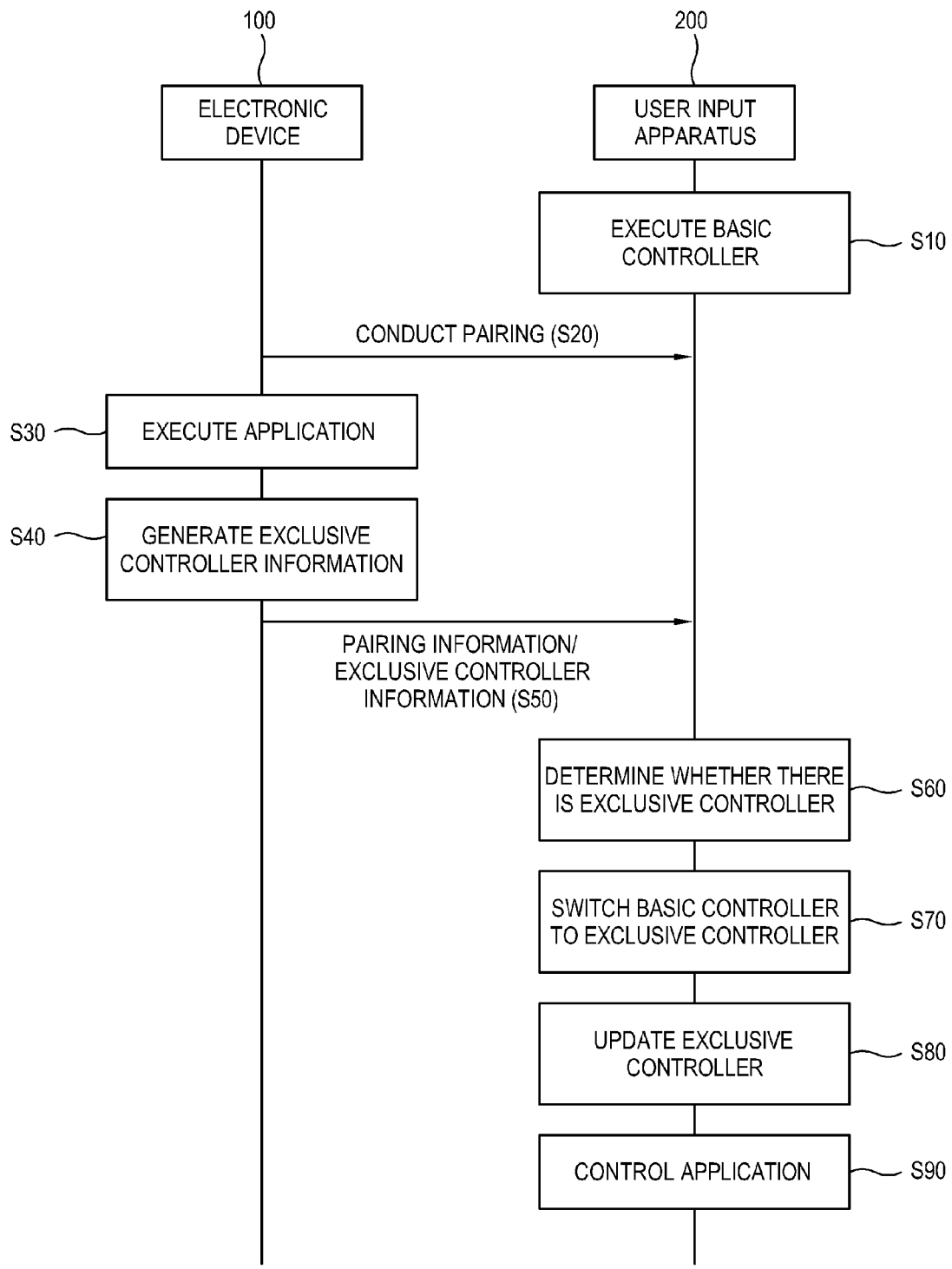
FIG. 3 is a flowchart illustrating a control method of the electronic device and the user input apparatus of FIG. 1 according to an exemplary embodiment.

FIG. 3 is a flowchart illustrating a control method of the electronic device and the user input apparatus of FIG. 1 according to an exemplary embodiment. A process of the user input apparatus 200 controlling the application 120 is described as follows with reference to FIG. 3.

First, a user executes the basic controller 220 of the user input apparatus 200 (S10) to conduct pairing of the user input apparatus 200 with the electronic device 100 (S20).

After pairing the user input apparatus 200 with the electronic device 100, the user executes the application 120 through the basic controller 220 (S30).

The information generation unit 130 of the electronic device 100 generates information about an exclusive controller from the application 120 (S40). The information about the exclusive controller includes information about whether there is the exclusive controller, an application ID, information about a version of the application, and information about a source from which to download the exclusive controller 230. The generated information about the exclusive controller is transmitted along with pairing information to the user input apparatus 200 (S50).

The second controller 240 of the user input apparatus 200 determines whether there is an exclusive controller corresponding to the received information about the exclusive controller (S60).

If it is determined that the exclusive controller 230 exists, the second controller 240 switches the basic controller 220 to the exclusive controller 230 to control the application 120 (S70).

In this process, pairing the electronic device 100 with the exclusive controller 230 is realized based on the pairing information such as information about matching of the electronic device 100 with the user input apparatus 200 and an MAC address, without further setting or selection by the user.

Additionally, the second controller 240 may update the exclusive controller 230 based on the application ID, the information about the version of the application, and the information about the source (S80). The source information may include a web address to download the exclusive controller 230. The second controller 240 may identify a version of the exclusive controller 230 through the information about the version of the application, and may download an up-to-date exclusive controller 230 using the source information if the current exclusive controller 230 is not a latest version.

The user executes the exclusive controller 20 to control the application 120 (S90).

According to another exemplary embodiment, the user may execute the application 120 in the electronic device 100, rather than in the user input apparatus 200. In this case, the information about the exclusive controller and the pairing information are transmitted from the electronic device 100 to the user input apparatus 200 as well, and the user may control the application 120 using the user input apparatus 200 without additional selection.

Figure 4:
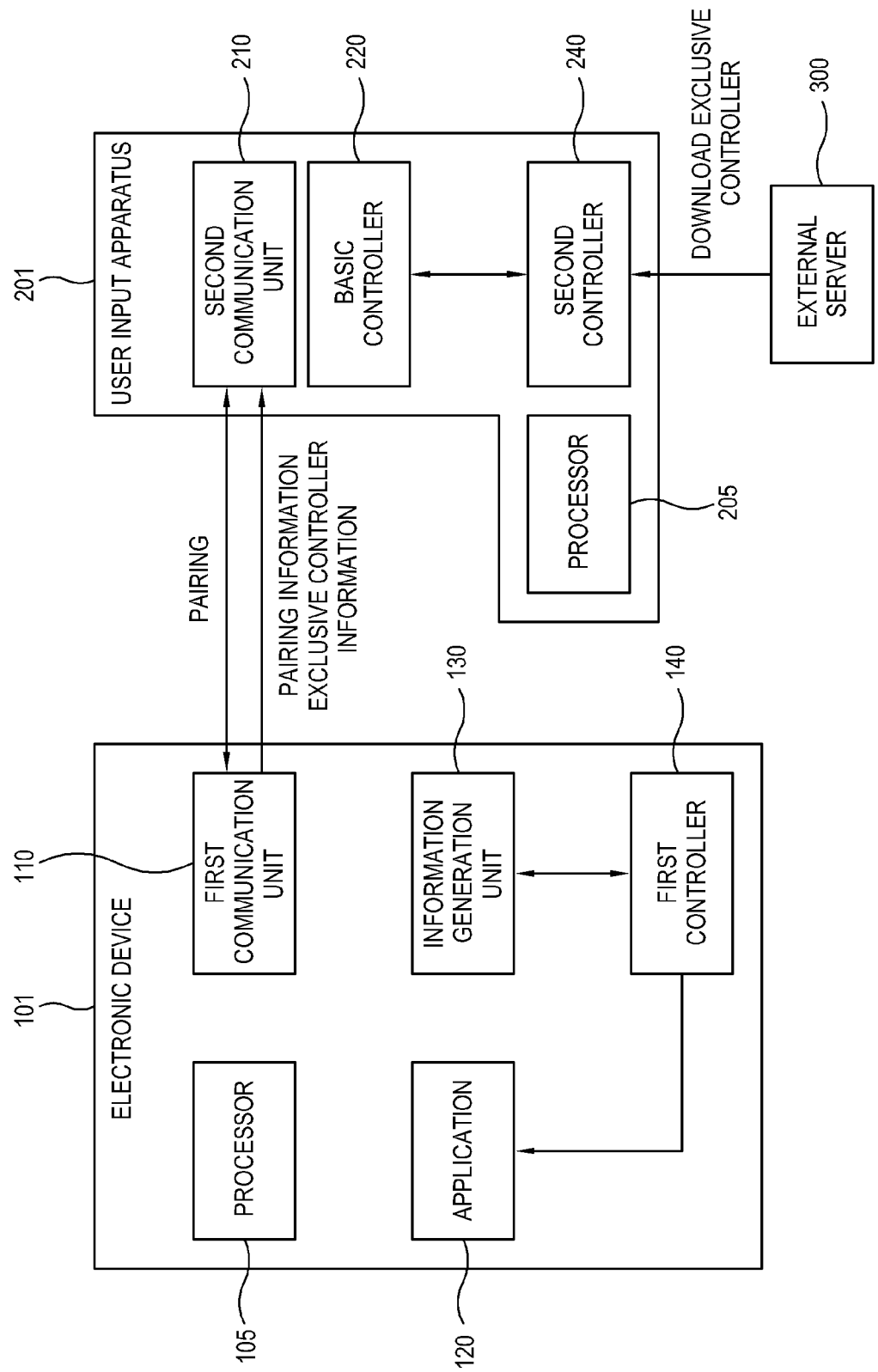
FIG. 4 is a block diagram of an electronic device and a user input apparatus according to another exemplary embodiment.

FIG. 4 is a block diagram of an electronic device and a user input apparatus according to another exemplary embodiment. As shown in FIG. 4, a user input apparatus 201 according to the present exemplary embodiment does not include an exclusive controller.

The user input apparatus 201 receives information about an exclusive controller from an electronic device 101, such as information about whether there is an exclusive controller, an application ID, information about a version of an application, and information about a source from which to download the exclusive controller, and determines whether there is an exclusive controller in the user input apparatus 201. If it is determined that an exclusive controller does not exist, a second controller 240 downloads an exclusive controller from an external server 300 based on the information about the source.

According to a related art method, in order to download a particular application or software to a device, it is necessary to access a website to download the application from, for example, an application market site, to search for the application, to download and execute the retrieved application. Further, it is also necessary to perform new pairing of the downloaded application with an electronic device to be controlled.

The user input apparatus 201 according to the present exemplary embodiment allows automatic retrieving, downloading and executing an exclusive controller in order to solve such inconvenience and to control an application 120 in optimal conditions.

Figure 5:
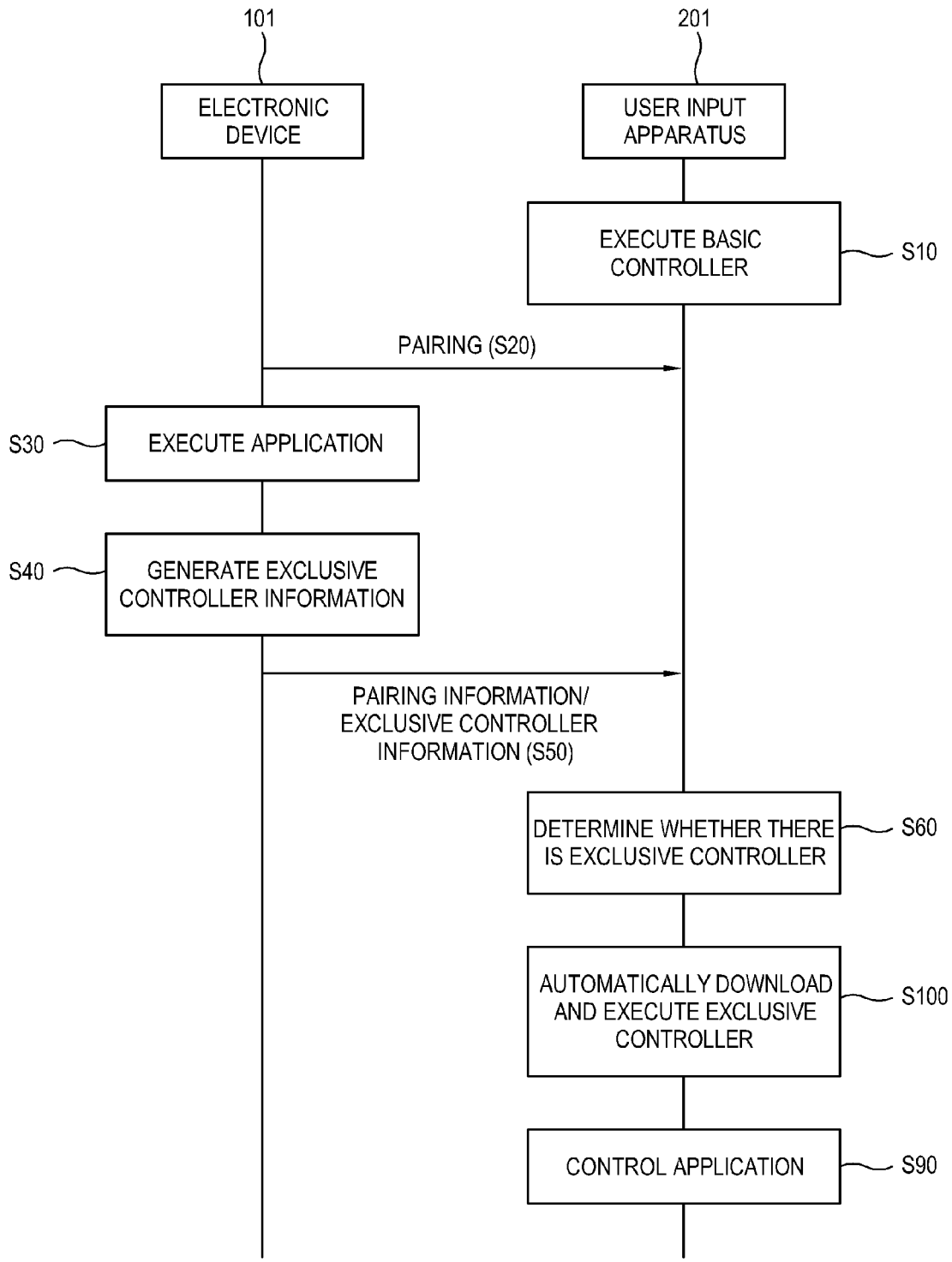
FIG. 5 is a flowchart illustrating a control method of the electronic device and the user input apparatus of FIG. 4 according to an exemplary embodiment.

FIG. 5 is a flowchart illustrating a control method of the electronic device and the user input apparatus of FIG. 4 according to an exemplary embodiment. A process of the user input apparatus 201 controlling the application 120 is described as follows with reference to FIG. 5.

As shown in FIG. 5, processes of executing a basic controller 220 (S10) and of pairing the electronic device 101 with the user input apparatus 201 (S20), a process of executing the application 120 through the basic controller 220 (S30), a process of generating information about an exclusive controller (S40), a process of transmitting the information about the exclusive controller along with pairing information to the user input apparatus 201 (S50), and a process of the second controller 240 of the user input apparatus 201 determining whether there is an exclusive controller corresponding to the exclusive controller information (S60) are similar to or substantially the same as in the above exemplary embodiment with reference to FIG. 3.

If it is determined that an exclusive controller does not exist in the user input apparatus 201, the second controller 240 automatically downloads and executes an exclusive controller using source information of the exclusive controller information (S100).

The downloaded exclusive controller is automatically paired with the electronic device 101, and a user may control the application 120 of the electronic device 101 using the exclusive controller (S90).

Figure 6:
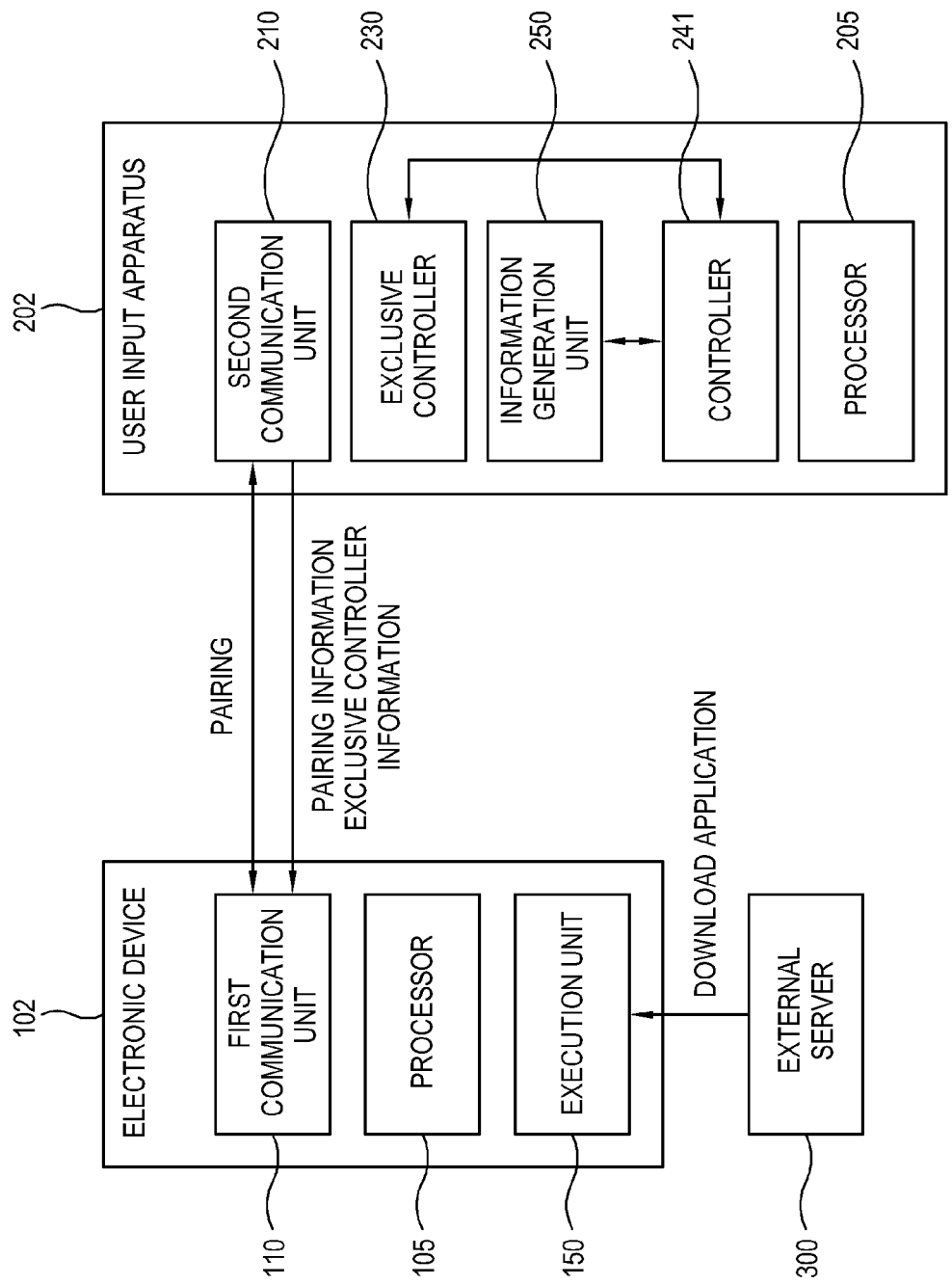
FIG. 6 is a block diagram of an electronic device and a user input apparatus according to still another exemplary embodiment.

FIG. 6 is a block diagram of an electronic device and a user input apparatus according to still another exemplary embodiment.

As shown in FIG. 6, an electronic device 102 includes a first communication unit 110, an execution unit 150, and a hardware processor 105 configured to control and/or execute the first communication unit 110 and the execution unit. The user input apparatus 202 includes a second communication unit 210, an exclusive controller 230, an information generation unit 250, a controller 241, and a hardware processor 205 to control and/or execute the second communication unit 210, the exclusive controller 230, the information generation unit 250, and the controller 241. An application is not installed in the electronic device 102, and the exclusive controller 230 is installed in a user input apparatus 202. The user input apparatus 202 according to the present exemplary embodiment determines whether there is an application corresponding to the exclusive controller 230 using the exclusive controller 230, and controls the electronic device 102 to download and execute the application if there is no application in the electronic device 102.

The first communication unit 110 and the second communication unit 210 are similar to or substantially the same as those in the foregoing exemplary embodiments.

The exclusive controller 230 of the user input apparatus 202 is software controlling an application executable in the electronic device 102, and the exclusive controller 230 includes information about identification of an application controlled by the exclusive controller 230.

The information generation unit 250 generates information about an application using the information obtained through the exclusive controller 230. The application information may include an application ID, information about a version of an application, and information about a source to download an application from.

The controller 241 controls the exclusive controller 230 to be paired with the electronic device 102, controls the information generation unit 250 to generate application information when the exclusive controller 230 is paired with the electronic device 102, and controls the second communication unit 210 to transmit the application information to the electronic device 102. The controller 241 further transmits information about pairing with the electronic device 102 together with the application information to the user input apparatus 202. The pairing information enables the exclusive controller 230 to control the application without an additional pairing process when the application is controlled by the exclusive controller 230.

The execution unit 150 of the electronic device 102 automatically downloads the application based on the application information received through the first communication unit 110 and executes the downloaded application. The electronic device 102 may download and update the application through communication with an external server 300.

Alternatively, the application may be installed in the electronic device 102 and automatically retrieved, executed, and controlled by the exclusive controller 230 of the user input apparatus 202. That is, the application may be automatically controlled by an exclusive controller, rather than by a basic controller. In this case, information about identification of the application included in the exclusive controller is used.

Figure 7:
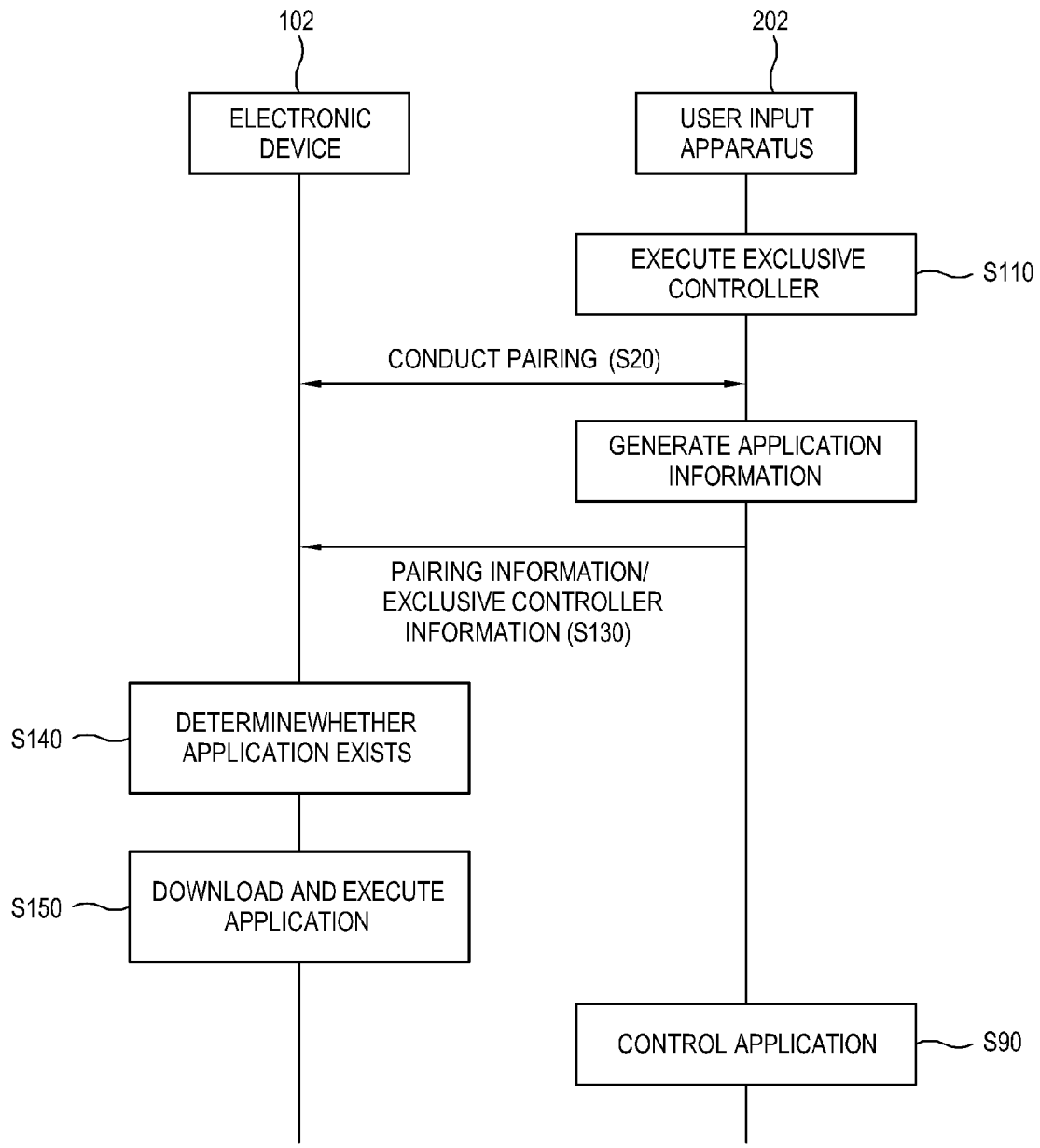
FIG. 7 is a flowchart illustrating a control method of the electronic device and the user input apparatus of FIG. 6 according to an exemplary embodiment.

FIG. 7 is a flowchart illustrating a control method of the electronic device and the user input apparatus of FIG. 6 according to an exemplary embodiment. A process of executing an application according to the present exemplary embodiment is described with reference to FIG. 7.

A user executes the exclusive controller 230 of the user input apparatus 202 (S110).

In this process, the electronic device 102 is paired with the user input apparatus 202 (S20), and the information generation unit 250 generates information about an application controlled by the exclusive controller 230 (S120).

The generated application information and pairing information are transmitted to the electronic device 102 through the second communication unit 210 (S130).

The execution unit 150 of the electronic device 102 determines whether there is an application corresponding to the transmitted application information (S140). If it is determined that there is no application, an application is automatically downloaded based on the application information and executed (S150).

Then, the application of the electronic device 100 is controlled by the exclusive controller 230 (S90).

As described above, one exemplary embodiment provides an electronic device which is configured to readily execute an exclusive controller controlling an application without additional selection by a user, a user input apparatus controlling the same, and a control method thereof.

Another exemplary embodiment also provides an electronic device which is configured to easily update and install an exclusive controller controlling an application without additional selection by a user, a user input apparatus controlling the same, and a control method thereof.

In addition, still another exemplary embodiment provides an electronic device which is configured to readily install and execute an application controlled by an exclusive controller controlling without additional selection by a user, a user input apparatus controlling the same, and a control method thereof.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. An electronic device configured to execute a first application and controllable by a user input apparatus receiving a user input, comprising:
   a communication unit that is configured to communicate with the user input apparatus;
   a controller that is configured to:
   receive the user input from the user input apparatus in which a basic control application is executed,
   execute the first application according to the received user input,
   generate, using information regarding the executed first application, information about a second application that is an exclusive control application which controls the executed first application and is to be executed in the user input apparatus, and
   control the communication unit to transmit the generated information about the second application to the user input apparatus, wherein the first application is controlled by the second application when the second application is executed in the user input apparatus based on the generated information.

2. The electronic device of claim 1, wherein the information about the second application comprises information about whether the second application exists, an application identifier for the second application, information about a version of the second application, and information about a source from which to download the second application.

3. The electronic device of claim 1, wherein the controller controls the communication unit to transmit information about connecting in communication with the user input apparatus to the user input apparatus.

4. A user input apparatus configured to receive a user input, the user input apparatus comprising:
   a communication unit that is configured to communicate with an electronic device that is adapted to execute a first application; and
   a controller that is configured to:
   control, using a basic control application, the communication unit to transmit the user input to the electronic device to execute the first application in the electronic device in which information about a second application is generated using information regarding the executed first application,
   receive, through the communication unit, information about the second application that is an exclusive control application which controls the first application and is adapted to be executed in the user input apparatus, from the electronic device, and
   automatically execute the second application based on the received information about the second application to control the first application.

5. The user input apparatus of claim 4,
   wherein the controller conducts connecting in communication with the electronic device through the basic control application, determines whether the second application exists in the user input apparatus when the information about the second application is received, and switches the basic control application to the second application to control the first application if it is determined the second application exists.

6. The user input apparatus of claim 4, wherein the information about the second application comprises information about whether the second application exists, an application identifier of the second application, information about a version of the second application, and information about a source from which to download the second application, and
   the controller determines whether the second application exists in the user input apparatus, and downloads the second application based on the information about the source if it is determined that the second application does not exist in the user input apparatus.

7. The user input apparatus of claim 4, wherein the information about the second application comprises information about whether the second application exists, an application identifier of the second application, information about a version of the second application, and information about a source from which to download the second application, and
   the controller updates the second application based on the application identifier, the information about the version of the application, and the information about the source.

8. The user input apparatus of claim 4, wherein the communication unit receives information about connecting in communication with the user input apparatus, and the controller conducts connecting in communication with the electronic device using the information about the connecting in communication when executing the second application.

9. A control method of a user input apparatus configured to receive a user input, the control method comprising:
   connecting the user input apparatus in communication with an electronic device through a basic control application of the user input apparatus, the electronic device being adapted to execute a first application;
   controlling, using the basic control application, to transmit the user input to the electronic device to execute the first application in the electronic device in which information about a second application is generated using information regarding the executed first application;
   receiving at the user input apparatus information about the second application that is an exclusive control application which controls the first application and is adapted to be executed in the user input apparatus, from the electronic device; and
   automatically executing the second application at the user input apparatus, based on the received information about the second application, to control the first application.

10. The control method of claim 9, further comprising:
    determining whether the second application exists in the user input apparatus; and
    switching the basic control application to the second application to control the application if it is determined that the second application exists in the user input apparatus.

11. The control method of claim 9, wherein the information about the second application comprises information about whether the second application exists, an application identifier of the second application, information about a version of the second application, and information about a source from which to download the second application,
    the control method further comprising:
    determining whether the second application exists in the user input apparatus; and
    downloading the second application based on the information about the source if is determined that the second application does not exist.

12. The control method of claim 9, wherein the information about the second application comprises information about whether the second application exists, an application identifier of the second application, information about a version of the the second application, and information about a source from which to download the second application,
the control method further comprising updating the second application based on the application identifier, the information about the version of the application, and the information about the source.

13. An electronic device configured to execute a first application and controllable by a user input apparatus receiving a user input, the electronic device comprising:
a communication unit that is configured to communicate with the user input apparatus; and
a controller that is configured to:
in response to a first user input being received from the user input apparatus in which a basic control application is executed, perform an operation of the electronic device, and
in response to information being received from the user input apparatus which executes a second application, automatically execute the first application based on the received information,
wherein the information is generated by the user input apparatus in response to a second user input at the user input apparatus and is about the first application that is controlled by the second application which is an exclusive control application to control the first application, and the information about the first application is generated at the user input apparatus using information about identification of the first application included in the second application.

14. The electronic device of claim 13, wherein the information about the first application comprises an application identifier, information about a version of the first application, and information about a source from which to download the first application, and
the controller downloads the first application based on the information about the source and executes the downloaded first application.

15. The electronic device of claim 13, wherein the communication unit receives information about connecting in communication with the user input apparatus, and the controller performs connecting in communication with the user input apparatus using the information about the connecting in communication when executing the first application.

16. A user input apparatus configured to receive a user input comprising:
a communication unit that is configured to communicate with an electronic device adapted to execute a first application; and
a controller that is configured to:
control, using a basic control application, the communication unit to transmit a first user input to the electronic device to perform an operation of the electronic device according to the first user input,
in response to a second user input being input to execute a second application, generate information about the first application, using information about the second application that is an exclusive control application which controls the first application, and
control the communication unit to transmit the information about the first application to the electronic device to execute the first application in the electronic device or download the first application in the electronic device based on the transmitted information about the first application.

17. The user input apparatus of claim 16, wherein the information about the first application comprises an application identifier of the first application, information about a version of the first application, and information about a source from which to download the first application.

18. The user input apparatus of claim 16, wherein the controller transmits information about connecting in communication with the electronic device to the electronic device.

19. A control method of an electronic device configured to execute a first application, and controllable by a user input apparatus configured to receive a user input, the control method comprising:
in response to a first user input being received from the user input apparatus in which a basic control application is executed, performing an operation of the electronic device; and
in response to information being received from the user input apparatus which executes a second application, automatically executing the first application based on the received information,
wherein the information is generated by the user input apparatus in response to a second user input at the user input apparatus and is about the first application that is controlled by the second application which is an exclusive control application to control the first application, and the information about the first application is generated at the user input apparatus using information about identification of the first application included in the second application.

20. The control method of claim 19, wherein the information about the first application comprises an application identifier, information about a version of the first application, and information about a source from which to download the first application, and
the automatically executing the first application further comprises downloading the first application based on the information about the source.

21. The control method of claim 19, further comprising:
receiving at the electronic device information about connecting in communication with the user input apparatus; and
connecting in communication the electronic device with the user input apparatus using the information about the connecting in communication when executing the first application.

22. A control method of a user input apparatus configured to receive a user input, the control method comprising:
connecting the user input apparatus in communication with an electronic apparatus;
controlling, using a basic control application, the user input apparatus to transmit a first user input to the electronic device to perform an operation of the electronic device according to the first user input;
in response to a second user input being input to execute a second application, generating at the user input apparatus information about a first application, using information about the second application that is an exclusive control application which controls the first application; and
transmitting the information about the first application from the user input apparatus to the electronic device to execute the first application in the electronic device or to download the first application in the electronic device based on the transmitted information about the first application.

23. The control method of claim 22, further comprising transmitting information about connecting in communication with the electronic device from the user input apparatus to the electronic device.

24. A control method of an electronic device configured to execute a first application, and controllable by a user input apparatus configured to receive a user input, the control method comprising:

receiving the user input from the user input apparatus in which a basic control application is executed;

executing the first application according to the received user input;

generating, using information regarding the executed first application, at the electronic device, information about a second application, that is an exclusive control application which controls the executed first application and is to be executed in the user input apparatus; and transmitting the information about the second application from the electronic device to the user input apparatus, wherein the first application is controlled by the second application when the second application is executed in the user input apparatus based on the transmitted information.

25. The control method of claim 24, further comprising transmitting information about connecting in communication with the user input apparatus from the electronic device to the user input apparatus.

* * * * *